United States Patent [19]

Keeler, II

[11] 3,761,643

[45] Sept. 25, 1973

[54] VIDEO PLAYBACK UNIT IN INACCESSIBLE CONTAINER

[76] Inventor: Miner S. Keeler, II, 2525 Indian Tr., S. E., Grand Rapids, Mich.

[22] Filed: July 16, 1971

[21] Appl. No.: 163,236

[52] U.S. Cl. ...... 179/100.2 S, 179/100.2 Z, 274/4 C

[51] Int. Cl. ........................ G11b 15/04, G11b 23/04

[58] Field of Search ............... 179/100.2 S, 100.2 Z, 179/100.2 T, 100.11; 274/4 B, 4 L, 4 D, 4 E, 4 J; 242/199, 200; 178/6.6 A

[56] References Cited

UNITED STATES PATENTS

| | | | |
|---|---|---|---|
| 3,484,548 | 12/1969 | Kowal | 178/6.6 A |
| 2,543,146 | 2/1951 | Bace | 178/7.8 |
| 3,647,984 | 3/1972 | Watanabe | 179/100.2 Z |
| 2,971,716 | 2/1961 | Sampson | 179/100.2 S |
| 3,578,338 | 5/1971 | Veno | 274/4 B |
| 3,604,624 | 9/1971 | Miura | 274/11 D |
| 3,423,038 | 1/1969 | Katzef | 242/199 |
| 3,608,908 | 9/1971 | Yamamoto | 179/100.2 Z |
| 3,566,132 | 2/1971 | Walker | 179/100.2 S |
| 3,601,557 | 8/1971 | Lennox | 179/100.2 Z |

*Primary Examiner*—Bernard Konick
*Assistant Examiner*—Jay P. Lucas

[57] ABSTRACT

A cassette type video playback unit is mounted in a non-accesible case having only a signal output lead and a power cord extending from the case for transmitting the signals to the display and controlling the operation of the playback mechanism. Included in the playback unit is a control circuit and indicator for providing a visual indication when the tape unit has completed one playback cycle and for automatically stopping the unit at the end of one playback cycle. The indicating means additionally provides a visual indication of the number of completed cycles and the position of the playback tape at any given time during a playback cycle. The playback unit provides composite television signals which can be coupled directly to the antenna terminals of a conventional television receiver by means of the signal output lead, and is particularly well suited for rental use since the tape playback mechanism is inaccessible, and the operation is simplified by being solely controlled by plugging and unplugging the power cord for initiating and terminating operation.

11 Claims, 5 Drawing Figures

INVENTOR
MINER S. KEELER II
BY Price, Heneveld, Huizenga & Cooper
ATTORNEYS

INVENTOR
MINER S. KEELER II
BY Price, Heneveld, Huizenga & Cooper
ATTORNEYS

VIDEO PLAYBACK UNIT IN INACCESSIBLE CONTAINER

BACKGROUND OF THE INVENTION

The present invention relates to a video playback unit and particularly to such a unit enclosed in an inaccessible case having only power cord and antenna terminal connections extending therefrom. Presently, there are several video tape recorders and playback mechanisms which allow a viewer to selectively record television programs for later playback. Also, there are currently available pre-recorded tapes for educational as well as entertainment use. These pre-recorded tapes are available for sale for playback by home tape playback units. The cost to the user however is relatively high, since video playback mechanisms are relatively expensiveas as are the pre-recorded tapes. It is desirable, therefore, to provide consumers with pre-recorded video programs which can be played through ordinary color television receivers at a nominal cost, preferably by renting a playback unit with a particular tape. If conventional video tape recorders or the like were rented including video program materials, however, it would be possible for the consumer to misadjust the playback mechanism or tamper with the tapes thereby either pirating the pre-recorded video information of causing damage to the tape machinery. It is desirable, therefore, to provide a playback unit which is inaccessible to the user such that neither the tapes nor the playback mechanism can be damaged or otherwise tampered with. The apparatus of the present invention provides consumers with relatively inexpensive pre-recorded video program material while protecting the distributors investment in the pre-recorded tapes and playback equipment.

It is an object of this invention, therefore, to provide a video playback unit which may be economically rented or otherwise distributed for use in conjunction with conventional television receivers.

It is an object, more specifically, of the present invention to provide an inaccessible video playback unit which is controlled by the renter or consumer solely by disconnecting and connecting the power cord.

It is an additional object of the present invention to provide a video playback unit which automatically stops after the completion of a playback cycle and simultaneously provides an indication that a playback cycle has been completed.

It is a further object of the present invention to provide an inaccessible video playback unit which can be rented and which provides an indication to the distributor as to the location of the tape with regard to a playback cycle when the unit is returned to the distributor such that the tape can be returned to a home position prior to the rental of the machine to a successive user.

It is additionally an object of the present invention to provide a source of pre-recorded video information which includes a cassette playback apparatus enclosed in an inaccessible container which can be rented by a consumer and operated solely by coupling the device to antenna terminals of a conventional television receiver and by connecting and disconnecting the device to a conventional alternating current outlet.

SUMMARY OF THE INVENTION

Apparatus embodying the present invention includes a cassette video tape playback mechanism, an endless loop tape employed with the tape mechanism, means thereon for automatically terminating the operation of the unit when a complete cycle of playback has been completed and for providing an indication thereof. A control circuit is provided for operating the playback mechanism and for providing power to electrical circuitry for developing composite television signals in response to video information recorded on the endless tape. The playback unit is mounted in a container having only signal output leads and power leads extending therefrom.

DETAILED DESCRIPTION OF THE DRAWINGS

Figure 1:
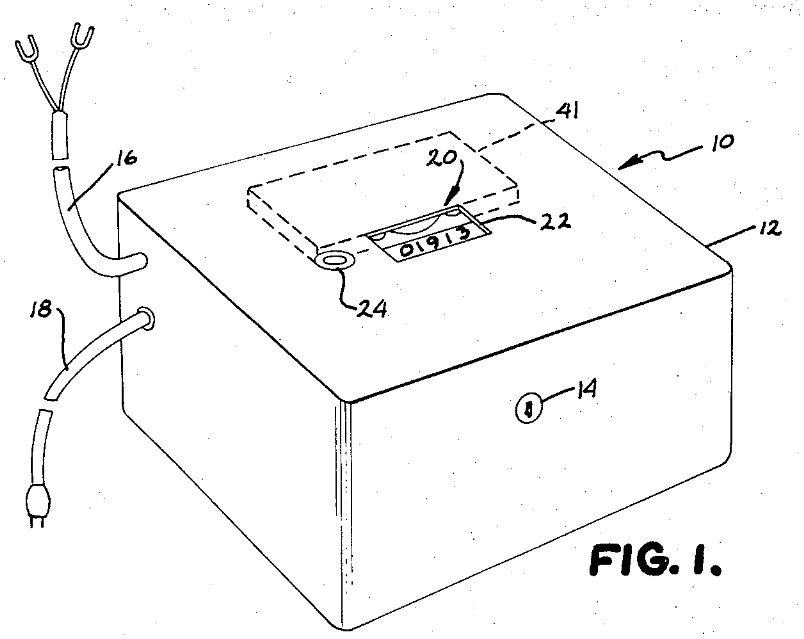
FIG. 1 is a perspective view of a playback unit illustrating two external connections and showing the visual indicating means contained thereon.

In FIG. 1 a playback unit 10 is mounted in a container 12 accessible only by unlocking an appropriate lock 14 shown on one panel of the container 12. Unlocking and removal or opening of this panel permits a distributor to change the video tape cassette contained therein or service the unit. The distributor may, in turn, rent the unit to a rental agency who will not have access to the unit but who will, in turn, rent out the unit to consumers. Alternatively, of course, the distributor may rent directly to the consumer.

The unit includes only two leads, one being the antenna lead 16 and the other being the power cord 18. These leads will be coupled to the circuitry within the container such that the video tape deck contained therein and the associated circuitry can be withdrawn from the container 12 by the distributor for servicing the unit and changing the cassette. Included on the container is indicating means 20 located on one surface of the playback unit 10. The indicating means includes a window portion 22 and an indicator light 24.

Figure 2:
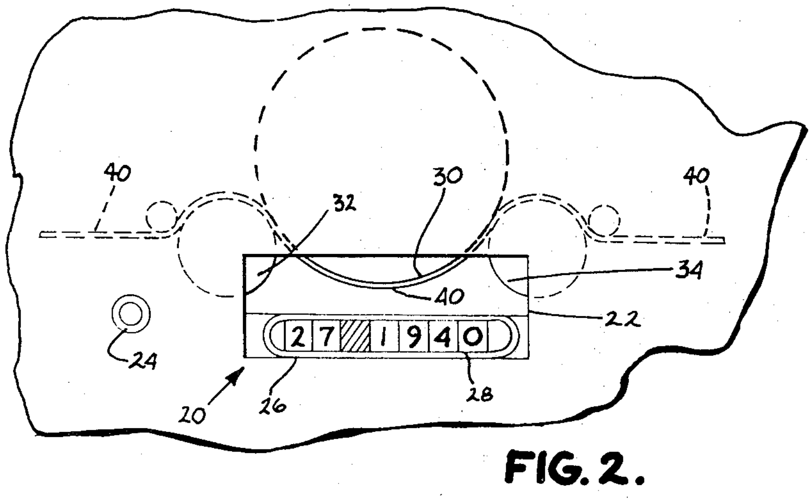
FIG. 2 is a fragmentary plan view of the indicating means showing in detail the window contained in the playback unit which reveals the counters and a portion of the playback mechanism.

A close-up view of the indicating means 20 is shown in FIG. 2. Through the window 22 the consumer, distributor or rental agent can see a first counter 26 which indicates the number of completed cycles of playback operation of the cassette 41 (FIG. 1) mounted in the unit, and a second counter 28 which indicates the expired footage of an individual playback cycle. For one hour of video program material, for example, with a tape speed of 7½ inches per second, the total footage of the tape would be approximately 2,460 feet. Thus, by viewing the second counter through the window, the consumer or distributor can ascertain at what point in the playback cycle the tape is presently located. Also viewable through the window 22 is a portion of the tape playback mechanism including a playback head 30 which is of the helical scan variety, capstans 32 and 34, and a portion 40 of the video tape itself. As noted below, the last few feet of the magnetic video tape can be color coded such that when viewed through the window 22, the user or rental agent is provided additional indicia of the completion of the playback cycle. Generally included in the indicating means 20 is an indicator light 24 which will become illuminated at the end of the playback cycle and remain on until the playback unit is unplugged and/or again plugged in to initiate a new playback cycle.

Figure 3:
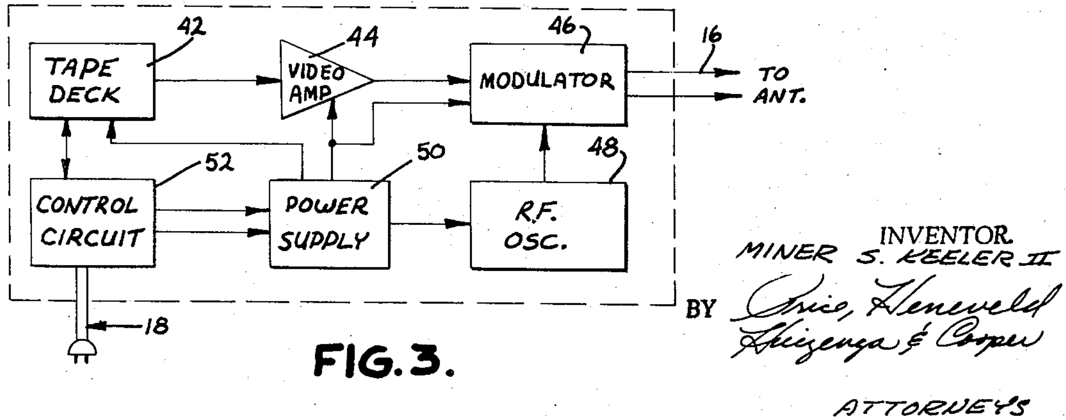
FIG. 3 is a block diagram of the electrical circuitry included in the playback unit.

The various electrical circuit components included in the playback unit 10 are shown in block diagram form at FIG. 3. In the figure, a tape deck 42 is included for playing the video cassette type of tapes. As noted above, the tape deck may employ a helical scan type of playback head which detects the video signals recorded on one-half inch magnetic video tape and provides video output signals which are coupled to a video amplifier 44. Audio signals may also be included and the recorded signals can be standard N.T.S.C. television signals. The video amplifier 44 may include in addition to amplifying stages, a variety of other circuitry such as gamma correction circuits, video level setting circuits, or the like.

The video output signals from the video amplifier 44 are applied to a modulator circuit 46. An RF (radio frequency) oscillator 48, which can be selectively tuned to an unused television channel in any given rental area, supplies an RF carrier signal to the modulator which modulates the carrier signal with the composite television type signals including the video information, the chromaninance information (when color T.V. signals are recorded), and audio information. The modulator circuit 46 may include an output amplifier (not shown), the output of which is coupled to the antenna lead 16. Lead 16 can be coupled to the antenna terminals of a T.V. receiver to provide the receiver with standard N.T.S.C. type of composite television signals during the playback operation of the unit. In other embodiments the antenna lead may not be used. In such an embodiment the output of the amplifier is fed to an antenna in the container such that the T.V. receiver could detect the resulting signals radiating from the unit without requiring a direct antenna coupling.

In FIG. 3 the circuits 42 through 48 are supplied with operating power by means of a power supply 50 which is controlled by a control circuit 52. The power cord 18 is directly coupled to the control circuit 52 which is shown in greater detail in FIG. 5. Referring particularly to that figure, one side 17 of the power cord 18 is grounded while the other side 19 provides the alternating current power which operates the various stages of the unit. A lamp such as a neon bulb 54 is serially connected with a resistor 55, the combination coupled between lines 17 and 19 of the power cord 18. Thus, whenever the plug is inserted into an AC power socket, lamp 54 will be lighted. A rectifier such as diode 54 has its anode coupled to line 19 and its cathode coupled to a filter capacitor 58 coupled from the cathode of diode 56 to ground. A rectified direct current voltage (indicated af B+ in the figure) is thereby provided at terminal 59.

Coupled from terminal 59 to ground is a series combination of a resistor 61, a photo resistance cell 63, and an adjustable resistor 65. The junction 64 of photo resistance cell 63 with adjustable resistor 65 is coupled to a gate electrode 70*g* of a silicon controlled rectifier (S.C.R.) 70 by means of a coupling capacitor 68. A gate resistor 69 couples the junction of coupling capacitor 68 and gate terminal 70*g* of S.C.R. 70 to ground. The cathode terminal 70*c* of S.C.R. 70 is coupled directly to ground. The anode terminal 70*a* of S.C.R. 70 is coupled to a terminal 72 by means of a current limiting resistor 71. Terminal 72 is coupled to terminal 59 by means of the parallel combination of an indicator light 24 and a relay coil 75. Associated with relay coil 75 is a normally closed single pole single throw switch 76 which is opened when current flows through relay coil 75 as described below.

Figure 5:
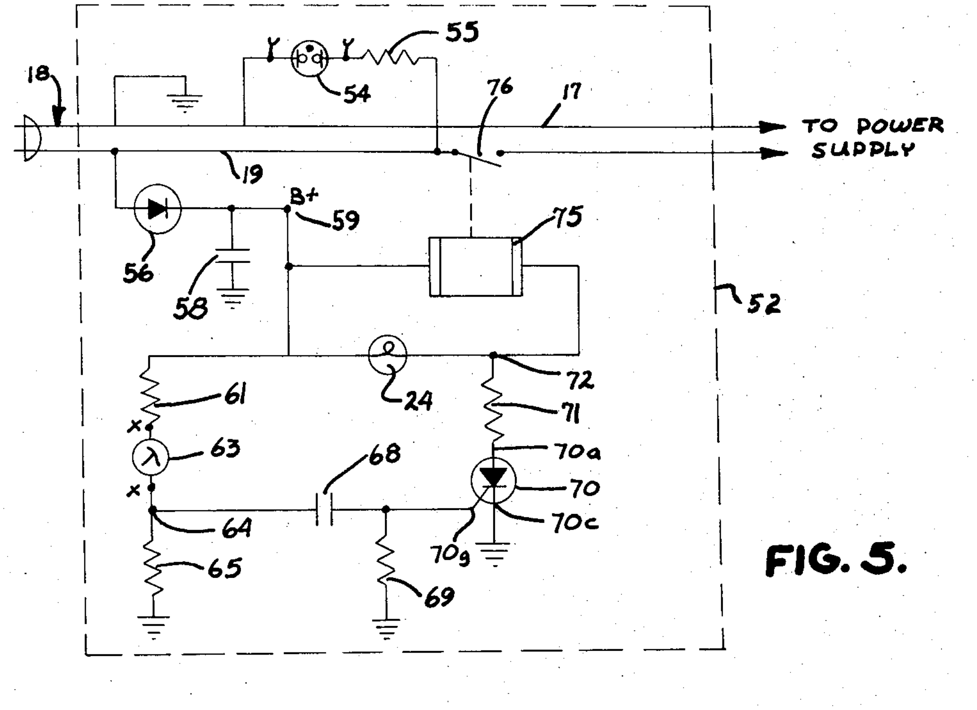
FIG. 5 is an electrical circuit schematic diagram of a control circuit suitable for use with the circuitry shown in FIG. 3.
Figure 4:
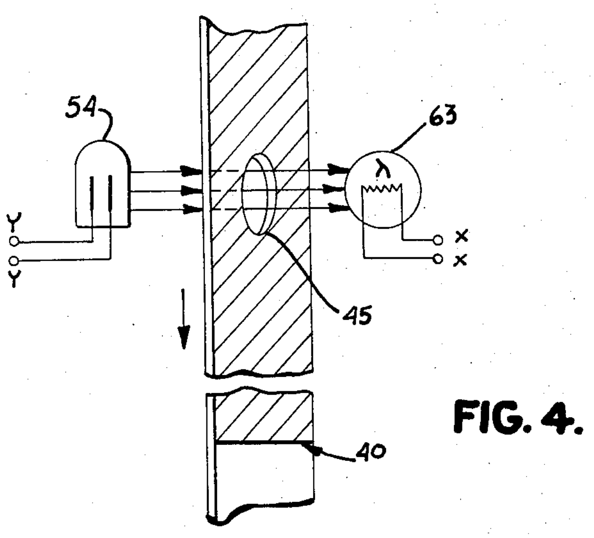
FIG. 4 is a detailed view of an illustrative means for detecting the end of the video tape as a completed playback cycle is reached.

FIG. 4 illustrates the use of the light 54 in conjunction with the photo resistance cell 63 to provide a control signal when the video tape has reached the end portion of a playback cycle. An aperture 45 (which may be in the form of an elongated slot) is provided on an end portion of the video tape. As the tape reaches the end portion (traveling in the direction indicated by the arrow shown adjacent the tape), light from the light source 54 travels through slot 45 to impinge upon the photo resistance cell 63. The light provides a marked decrease in the resistance of the photo resistance cell 63 which can be used to produce a control signal for S.C.R. 70 as described below. Light 54 and photo resistance cell 63 are physically located on either side of the tape 40 as shown and are coupled in the electrical control circuit 52 by means of terminals Y—Y and X—X as indicated in FIGS. 4 and 5. The lamp 54 and cell 63 can be mechanically mounted in the unit by various conventional means not shown in FIG. 4. They should, however, by physically near the playback head so as to provide a signal accurately indicating that the end of the tape has been reached.

It is noted that the upper portion of the tape 40 shown in FIG. 4 (which corresponds to the end of a playback cycle) is color coded, as represented by the shaded portion of the tape, such that it can be viewed through the window 22 as shown in FIG. 2 to provide additional visual display means for ascertaining that a completed playback cycle has been reached. When, for example, the unit is returned to the rental agent, the agent can look at the tape through window 22 to ascertain by means of the color coding whether or not the endless loop tape is at or near the end of a playback cycle without plugging in the device which could start a new cycle which must then be completed before the unit could be rented to the next user. Thus, by coloring the trailing few feet of the tape, a positive identification can be made when the tape is at or near the end of a playback cycle. In addition to the color coded tape, the elongated slot in combination with the light source and photo resistance cell provides a control signal for providing a variety of indicating functions.

OPERATION

It is desired to automatically stop the playback unit as the end of each playback cycle is completed. This operation is accomplished while at the same time providing a visual indication to the user that the playback cycle has been completed by the circuit shown in FIG. 5 in conjunction with the light source and photo resistant cell shown in FIG. 4. During playback, the prerecorded tape 40 will normally intercept light from the light source 54 and prevent it from striking the photo resistance cell 63. Thus, the photo resistance cell has a relatively high resistance (several megohms). This resistance forms part of the resistance voltage divider from B+ to ground including resistors 61 and 65 as shown in FIG. 5. The voltage across resistor 65 as a playback cycle is initiated by plugging in the power cord 18, will be insufficient to trigger the S.C.R. 70 which therefore remains nonconductive. With S.C.R. 70 nonconductive there will be no current return path for lamp 24 or relay coil 75 which have one terminal coupled to the B+ supply at terminal 59 and a remote terminal coupled to the S.C.R. by means of terminal 72. Thus the normally closed switch 76 associated with relay coil 75 remains closed and AC power is coupled to the power supply 50 as shown in FIG. 3 through the closed switch 76 and lead 17. Power supply 50 corresponds to the applied alternating current power to supply the tape deck, the video amplifier, the modulator and the RF oscillator with the required alternating current or direct current power to operate these stages.

If the tape 40 is not at a position where the aperture 45 is between the light source 54 and the photo resistance cell 63, the playback unit will be activated. As the end of the playback cycle is reached however, the elongated slot will pass between the light source and the photo resistance cell thereby providing a pulse of light to the photo resistance cell which responds thereto to greatly decrease the resistance of the cell. Since the cell is serially coupled in the voltage divider comprising resistor 61, cell 63 and resistor 65, the great reduction in resistance of the photocell will cause a pulse of voltage to be developed across resistor 65 which is in turn coupled to the gate terminal 70G of S.C.R. 70 by means of coupling capacitor 68. Resistor 65 is adjusted such that the magnitude of this pulse will be sufficient to render S.C.R. 70 conductive. Since the S.C.R. has its anode coupled to B+ through resistor 71 and the relay coil 75 and indicator lamp 24, when the gate voltage rises above the threshold voltage level due to the voltage pulse applied to the gate terminal 70G, the S.C.R. latches into conduction. With the S.C.R. conductive, terminal 72 is at nearly ground potential since resistor 71 has a relatively low value and the anode to cathode resistance of the S.C.R. is very low during conduction. Current will therefore flow through indicator lamp 24 and relay coil 75 such that the switch 76 will be opened to inactivate the playback unit while simultaneously lighting lamp 24 to provide a visual indication to the user that the playback cycle has been completed. It is noted that there will be some delay from the time the elongated slot 45 passes between the light source 54 and the photo resistance cell 63 before the S.C.R. 70 and relay 75–76 can respond to turn off the unit. During this time, the aperture 45 will have passed beyond the light path between the light source and cell such that a new cycle of operation can again be initiated.

Once the unit is automatically shut off, a new cycle of operation can be initiated by momentarily unplugging the line cord 18 and thereafter plugging it in again. Unplugging of the line cord 18 removes the B+ power from S.C.R. 70 (which is latched on following completion of a cycle) and renders it nonconductive. By replugging line cord 18 to the AC power source, power will once again be applied to the power supply since S.C.R. 70 is nonconductive and switch 76 is closed, and a new playback cycle of operation is thereby initiated.

In some embodiments it may be desirable to only appraise the user that the end of a playback cycle has been reached and that he will be charged an additional rental fee without automatically stopping the unit. In such case a pre-recorded audio and/or video message could be used to so inform the consumer. The circuit of FIG. 5 would be modified by removing relay 75 so that the playback unit would continue to operate until line cord 18 is unplugged. Conventional turn off circuitry could be employed to turn S.C.R. 70 off after being latched on and activating lamp 24. Alternately, light 24 could be allowed to remain on continuously after a completed playback cycle.

The counter which indicates the number of playback cycles completed and thereby provides a basis from which to determine the rental fee is triggered after a new cycle has begun and will not be triggered in the event the user wishes to interrupt the cycle of operation temporarily and then restart it by unplugging and replugging the power cord. There are a number of ways in which this counter can be activated to provide the desired function. One method of operating a counter such as an electrically operated step counter which responds to an electrical signal is to provide a second aperture located on the tape at a location corresponding to an initial portion of a playback cycle. This aperture would be located such that it would not interfere with the turn off light source 54 and photo cell 63 but only with an additional light source and photo cell employed to develop a pulse which could be processed and applied to the number of plays counter which would advance the counter one digit as the second aperture (not shown in the figure) passed by the second light source and photo cell arrangement. Such an arrangement could be similar to that shown in FIG. 4. It would be, of course, necessary that the two apertures would not inter-react with the other circuit and thereby interfere with the turn off operation or the play count operation associated with each individual aperture.

Another method which could be employed would be to prerecord a control signal on the tape and provide detection means coupled to the video amplifier 44 in FIG. 3 which could detect a unique encoded pulse or frequency signal and provide a control output signal which would advance the counter one digit as the tape portion corresponding to the initial portion of a playback cycle and which has a signal recorded thereon passes the pickup head associated with the tape deck 42.

It would be possible to provide a conductive strip of material along an edge of the tape near the beginning of the playback cycle. Two brushes or other suitable electrical contacts could be provided which contact the edge of the tape and would provide a momentary conduction path between their terminals as the conductive strip passed into simultaneous contact with them. The electrical contacts could be employed in an electrical circuit to provide a control signal which when applied to the number of plays counter, would advance the counter as the conduction path between the contacts was momentarily completed.

Likewise, various other modifications to the unit could be employed to provide the desired indicating and control functions. For example, the end portion of a playback cycle could include a conductive strip affixed to an edge on the tape (opposite the edge used for a conductive strip to trigger the number of plays counter) such that two adjacent conductors could be mounted to contact the conductive strip. Two external contacts could be coupled to the conductors such that the rental agent could perform an electrical continuity check between the external contacts to confirm that the endless loop tape was in its home (i.e. end of playback cycle) position when returned to the agency. If no continuity existed the agent would then plug the unit into the AC line and allow the unit to run until it automatically stopped in the home position and thereby be ready for rental to a user.

Although the embodiment described employs magnetic tape as the pre-recorded medium it would be possible to use any suitable recording medium as for example, vinyl tape or the like on which information is recorded and can be retrieved. Various other modifications of the control circuitry and the playback unit will be apparent to those skilled in the art and will fall within the scope of the present invention as defined in the appended claims.

The embodiments of the invention in which an exclusive property or privilege is claimed are defined as follows:

1. A tamperproof video playback unit including a prerecorded video tape within the unit, comprising: a limited access container, a video tape playback mechanism mounted in said container and adapted to provide video signals from a tape associated therewith, means at a predetermined location on said tape for producing an indication signal when said predetermined position on said tape has been reached, means for detecting the indication signal and providing an output signal representative thereof, a power cord extending from said limited access container and adapted to be coupled to an external source of operating energy, power supplying means for providing operation power for said video playback unit when coupled to the external source of energy, a control circuit for selectively coupling said power cord to said power supplying means, said control circuit coupled to said detection means and responsive to said output signal from said detection means to open the electrical circuit path between said power cord and said power supplying means and maintain said circuit path open until said power cord is decoupled from the external source of energy, said control circuit responsive to subsequent recoupling of said power cord to the external source of energy to couple said power cord to said power supplying means whereby said unit is actuated solely by connection to the external energy source by means of said power cord extending from said limited access container.

2. The video playback unit as defined in claim 1 wherein said means on said tape for providing an indication signal comprises an elongated aperture providing an optical communication path from one side of said tape to the opposite side thereof, and wherein said detecting means comprises a light source mounted on one side of said tape and a light responsive means mounted on opposite sides of said tape aligned such that light from said source will pass through said aperture in said tape and impinge upon said light responsive means as said aperture passes between said light source and said light responsive means whereby said detecting means provides an output signal deactuating said video playback unit to stop the tape only after said aperture in said tape has passed beyond the area between said light source and said light responsive means.

3. The video playback unit as defined in claim 1 wherein said control circuit includes actuatable switch means including switch contacts coupled between said power cord and said power supplying means for selectively opening and closing the electrical circuit path therebetween, and latch means coupled to said actuatable switch means and to said detecting means and responsive to said output signal from said detecting means at the end of a playback cycle to open said switch contacts and hold said contacts in an open position until said power cord is decoupled from the external source of energy.

4. The video playback unit as defined in claim 3 wherein said actuatable switch comprises a relay including a relay coil and normally closed switch contacts associated therewith and wherein said latch means comprises a voltage responsive switch having a control terminal coupled to said detecting means and switching terminals coupling said relay coil to said power cord.

5. The video playback unit as defined in claim 4 wherein said voltage responsive switch comprises an S.C.R. having a gate terminal coupled to said detection means and anode and cathode terminals coupling said relay coil to said power cord.

6. The video playback unit as defined in claim 5 and further including indicating means coupled between said S.C.R. and said power cord to provide a visual indication at the end of a playback cycle when said S.C.R. is actuated by a signal from said detecting means.

7. A video playback unit comprising: a limited access container including means for locking said container; a cassette video tape playback circuit and mechanism for providing video signals from pre-recorded video tape and including means for generating a control signal terminating the operation of said mechanism when a playback cycle has been completed and for providing an indication thereof, said unit being mounted in said container which includes only a signal output lead and a power lead extending therefrom; said power lead adapted to be electrically coupled to a power source; said means including circuit means for electrically disconnecting said playback unit from said power lead in response to said control signal to deactuate said playback unit at the termination of a playback cycle, said circuit means including latching means responsive to electrical energy on said power lead to electrically disconnect said playback unit from said power lead at the termination of a playback cycle and until electrical energy applied by said power lead is interrupted by electrically disconnecting said lead from the power source, said circuit means responsive to the subsequent reconnection of said lead to the power source to initiate an additional playback cycle.

8. A playback unit as defined in claim 7 and further including a counter mounted in said unit for indicating the number of playback cycles which have been initiated.

9. The video playback unit as defined in claim 7 wherein said latching means includes a relay having a relay coil and associated switch contacts wherein said switch contacts are coupled in series with said power lead; and voltage responsive switch means coupling said relay coil to said power lead, said voltage responsive switch having a control terminal coupled to said means for generating a control signal to be actuated by said control signal for opening said switch contactS and deactivating said playback unit at the end of a playback cycle.

10. The video playback unit as defined in claim 9 wherein said voltage responsive switch comprises an S.C.R. having a gate terminal coupled to said detecting means and anode and cathode terminals coupling said relay coil to said power cord.

11. The video playback unit as defined in claim 10 wherein said means for providing an indication that a playback cycle has been completed comprises an electrical lamp coupled between said S.C.R. and said power lead to be illuminated by current flowing therethrough when said S.C.R. is rendered conductive by said control signal.

* * * * *